United States Patent

[11] 3,585,805

| [72] | Inventor | Renic P. Vincent<br>Tulsa, Okla. |
|---|---|---|
| [21] | Appl. No. | 748,804 |
| [22] | Filed | July 30, 1968 |
| [45] | Patented | June 22, 1971 |
| [73] | Assignee | Pan American Petroleum Corporation<br>Tulsa, Okla. |

[54] UNDERWATER PIPE CONNECTOR
11 Claims, 12 Drawing Figs.

[52] U.S. Cl..................................................... 61/72.3,
61/69, 166/.6, 285/18, 285/24
[51] Int. Cl........................................................ F16l 1/00,
F16l 35/00
[50] Field of Search............................................ 61/72.3,
72.1, 69, 46, 81; 166/.6; 285/18, 24, 27; 29/429

[56] References Cited
UNITED STATES PATENTS

| 3,421,579 | 1/1969 | Manning ...................... | 61/69X |
| 3,482,410 | 12/1969 | Roesky et al. ................ | 61/72.3 |
| 3,199,553 | 8/1965 | Garrett et al. ................ | 285/24X |
| 3,298,092 | 1/1967 | Dozier et al. ................. | 166/.6X |
| 3,345,085 | 10/1967 | Hanes........................... | 285/27 |
| 3,358,753 | 12/1967 | Haeber......................... | 166/6 |

*Primary Examiner*—Jacob Shapiro
*Attorneys*—Paul F. Hawley and John D. Gassett

ABSTRACT: A pipe connector for connecting pipe together. In a preferred embodiment, the receptacle of the connector is mounted in the wall of a watertight underwater cellar and is provided with a cap on the interior of the cellar. A cable runs through this cap to a winch. The other end of the cable is connected to a pipeline lead plug which, when pulled into the receptacle, makes a sealing fit with its interior. The lead plug is connected to a pipeline lying on the ocean floor. Special stepped design of the receptacle and the plug prevents misalignment as the plug is pulled into the receptacle. A support ring surrounds the underwater cellar just below the receptacle for aiding in relieving the strain on the lead plug as it enters the receptacle.

PATENTED JUN22 1971

RENIC P. VINCENT
INVENTOR.

BY John D. Gassett

ATTORNEY

RENIC P. VINCENT
INVENTOR.

BY John D. Gassett
ATTORNEY

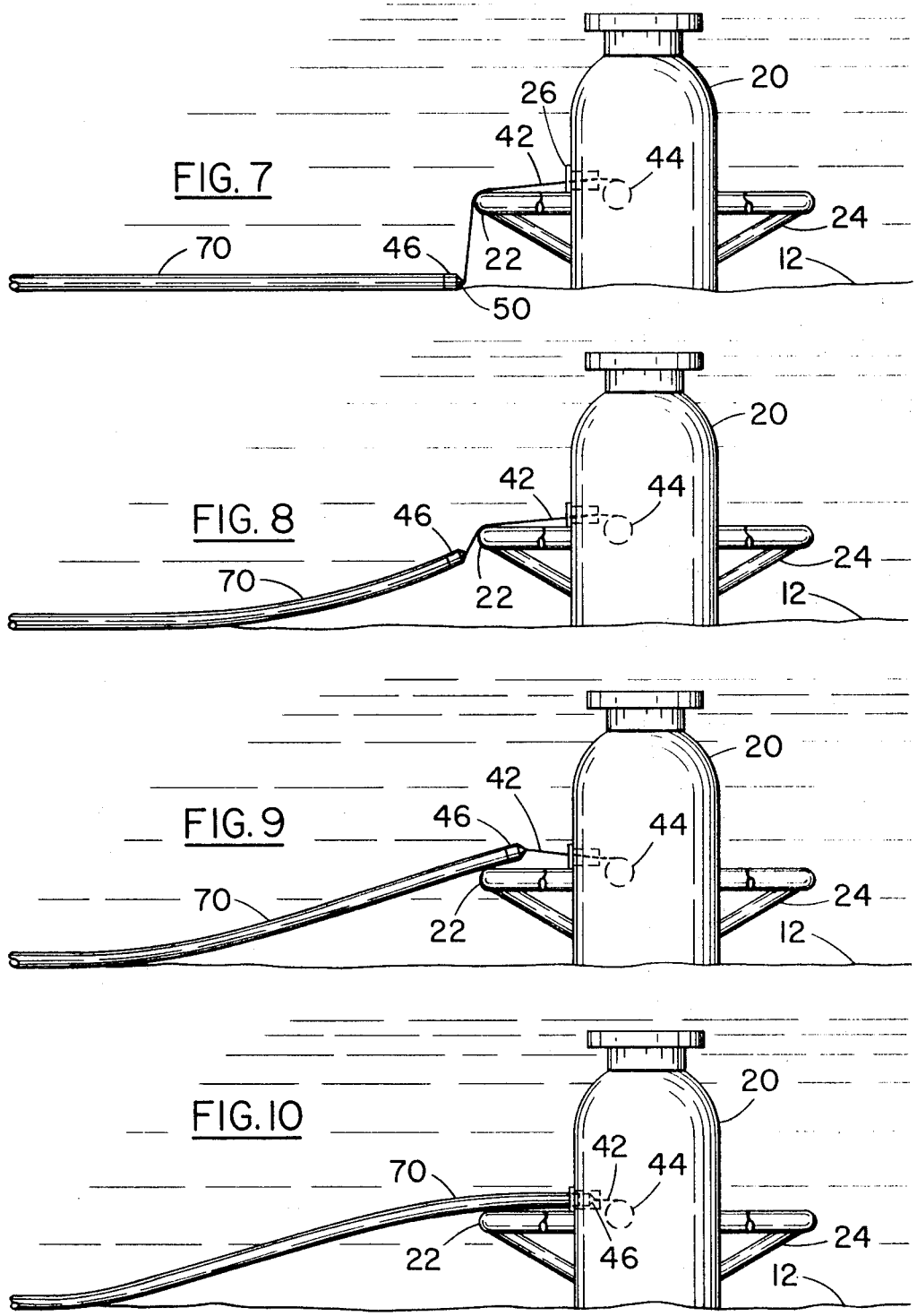

RENIC P. VINCENT
INVENTOR.

BY
John D. Hassett
ATTORNEY

UNDERWATER PIPE CONNECTOR

BACKGROUND OF THE INVENTION

This invention relates to means for connecting a underwater pipeline through the wall of an underwater cellar.

In recent years, more and more wells have been drilled in the ocean floor in the search for oil and gas. In the shallower water, these wells have ordinarily been completed on so-called permanent platforms which are in effect platforms which are supported by long legs or piles driven in the ocean floor. This is fairly satisfactory for relatively shallow water, e.g., 100 to 200 feet. As the depth of the water increases, the design and construction problems of these platforms, and the accompanying cost, rapidly increase.

It appears that the trend for completing wells in deeper water is to complete the wells on the ocean floor. Pipelines extend from each of these subsea completions to a central gathering facility located on the ocean floor. It is suggested that one such facility include a watertight underwater igloo or cellar. An oil and gas separating facility which serves many wells is placed in this underwater cellar. From this facility, a pipeline is connected to the surface. It is also suggested that this cellar or igloo be maintained at atmospheric pressure and that workmen enter the igloo from a diving capsule which has an exit which mates with a sealing entrance on the igloo itself. Thus workmen can be transported from the surface to the igloo and remain at atmospheric conditions at all times. This idea has merit, but to make it work satisfactorily there must be some way to connect pipelines from the various wells through the walls of the igloo to the facilities within without changing pressure within the igloo itself. The present invention discloses such a system.

BRIEF DESCRIPTION OF THE INVENTION

Briefly, in a preferred embodiment, this invention concerns a receptacle for mounting in the wall of an underwater igloo and a male or lead pipe plug for insertion into the receptacle. The plug is connected to a pipeline, or lines, which is to be connected through the wall of the igloo. The connector housing or receptacle is stepped; that is, it has two or three, preferably two, sections of varying diameter, with the largest diameter being on the outside and stepped downwardly to the inner section. The plug has two sections of different diameters. The lead section has a diameter approximately the same as that of the inner section of the receptacle. The other diameter is approximately equal to the diameter of the outer section of the receptacle. If a receptacle having only two sections of different diameters is used, then the length of the smaller portion of the pipe lead plug is approximately the same as the length of the outer larger diameter section of the receptacle. If the receptacle has three stepped sections, the length of the smaller portion of the plug is approximately the same as the length of the two outer sections of the receptacle.

The interior end of the receptacle is provided with a watertight pressure cap with a cable extending therethrough. The cable is connected on the inside of the igloo to a power means such as a winch and the other end of the cable is connected to the male plug. A support ring spaced, e.g., 10 feet, from the wall of the capsule surrounds the capsule (at a level just below the receptacle) for supporting the pipe as it enters the receptacle to avoid excessive bending stresses at the point of contact with the receptacle.

Various objects and a better understanding of the invention can be had from the following description taken in conjunction with the drawings.

DRAWINGS

FIGS. 7, 8, 9 and 10 illustrate stages of pulling a pipe upwardly over the ring support and into the pipe receptacle in the wall of an igloo;

DETAILED DESCRIPTION

Figure 2:
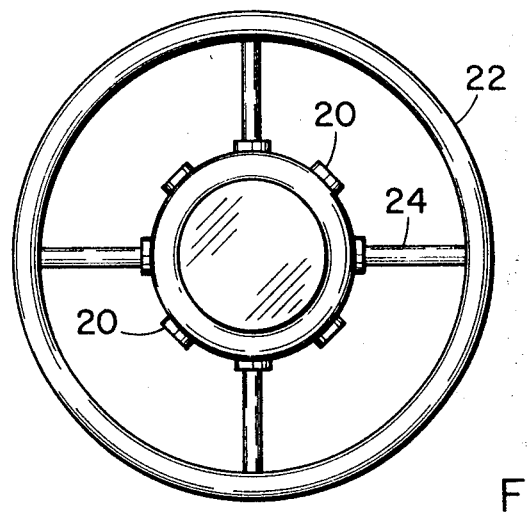
FIG. 2 illustrates a top view of FIG. 1.
Figure 1:
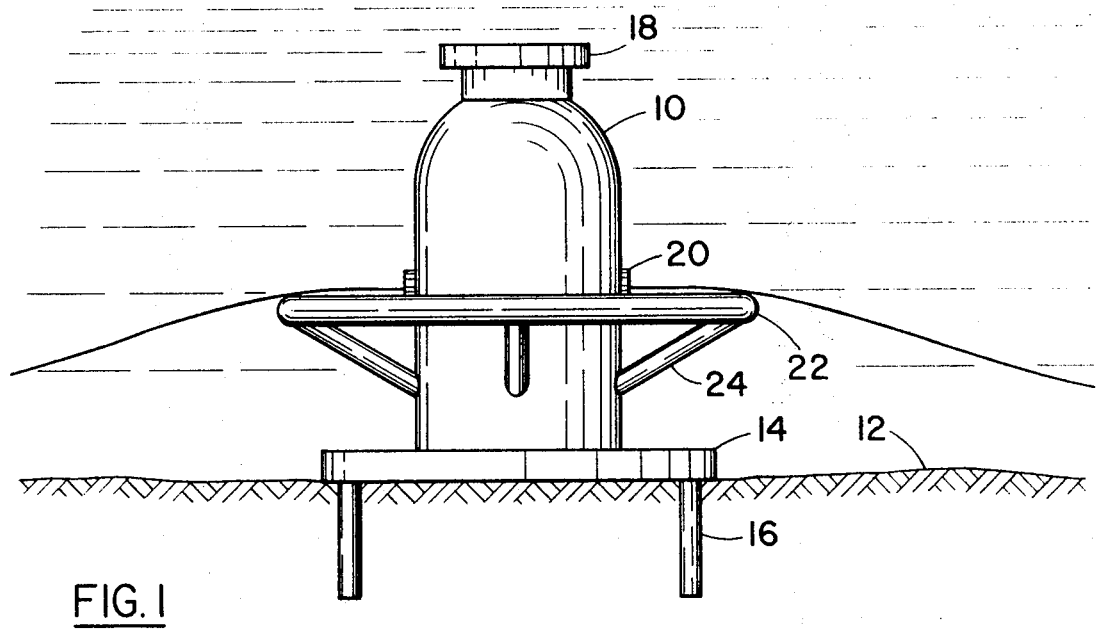
FIG. 1 illustrates an underwater igloo and support ring.

Attention is now directed to the drawings and particularly FIG. 1 and FIG. 2. Shown thereon is an igloo or cellar 10 mounted on the bottom of the ocean floor 12. The igloo 10 can take on any structurally correct shape which is sufficiently large to carry out the intended operations therein. The igloo is mounted on a base 14 which is anchored to the ocean floor by any suitable means such as anchor means 16. The wall of the igloo 10 is sufficiently strong to withstand the hydrostatic pressure of the water at the depth at which the igloo is placed. The igloo also contains a manhole cover indicated at 18. The purpose of the cover 18 is so that it can mate with a like opening on a diving capsule, not shown, which is lowered into contact with cover 18.

The wall of igloo 10 is provided with a plurality of pipeline receptacle housings 20. A support ring 22 is supported at an elevation just below the connector 20. Support ring 22 is supported from the igloo braces 24. Support ring 22 is placed at a distance from the igloo as a guide to assist in mating the connector to the pipeline as it is being made up. This distance can be, for example, 10 feet.

Figure 4:
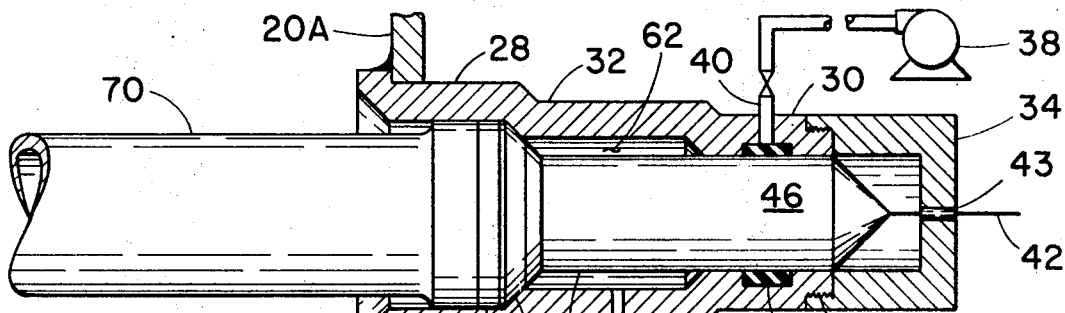
FIG. 4 illustrates the male lead plug completely inserted in the receptacle which is mounted in the wall of the igloo.
Figure 3:
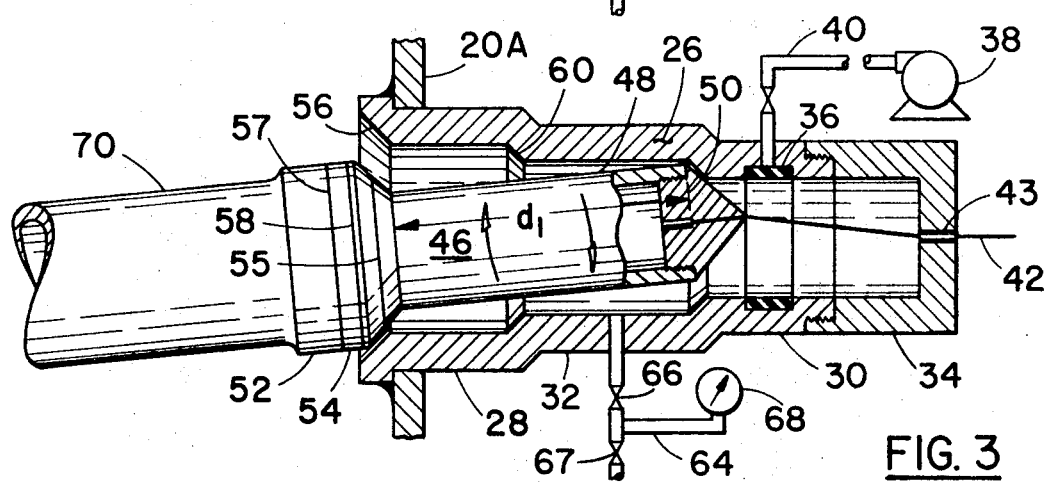
FIG. 3 illustrates the receptacle of this invention with the male pipe lead plug entering therein.

Attention is next directed to FIG. 3 which illustrates the receptacle housing 26 mounted in the wall 20A of the igloo. The embodiment of housing 26 of FIGS. 3 and 4 is made of three parts: outer part 28, an inner part 30 and an intermediate part 32. These are in stepped diameters, with the outer section being the largest. The inner section 30 is enclosed with a cap 34 which is connected thereto by bolts or flanges or threads 37. A packing means 36 is provided on the interior of the wall of the inner section 30. A pressure source 38 is connected through conduit 40 to actuate packing elements 36.

Extending through cap 34 is a cable 42 which extends through a packing gland 43 in a sliding and sealing relationship. The inner end 42 goes to a winch means 44 as indicated in FIG. 7. The other end of cable 42 is connected to a pipeline lead plug generally designated 46. Plug 46 is made of three basic parts, the main lead portion 48, cap 50 to which cable 42 is connected, and a base portion 52. Section 48 is approximately the same length as the combined length of intermediate section 32 and inner section 30 of the receptacle of FIG. 3 and 4. The diameter of portion 48 is approximately the same as the internal diameter of the inner section 30 of the receptacle. The diameter of base portion 52 of the plug is of approximately the same diameter as the inner diameter of outer section 28 of the receptacle. Base portion 52 has a packing 54. Base portion 52 and portion 48 merge together by sloping shoulder means which, as can be seen more clearly in FIG. 6, includes a ringlike shoulder member 58. Ringlike should member 58 is not attached to plug 52 but rather is merely fitted or placed on shoulder member 55 which is attached to or, as shown, is made a part of plug 52. Ringlike shoulder member 58 can be closely fitted to surface 59 so that it won't tend to slip off. The largest diameter of shoulder member 55 (as the diameter of surface 59) is of a smaller diameter than the inside diameter of intermediate section 32 of the receptacle. A second shoulder member 57 is provided on the base portion 52 of the plug. Packing 54 is between this shoulder member 57 and the movable ring shoulder member 58. When the pipe lead plug is inserted into the receptacle, shoulder member 58 mates with shoulder 60 of the receptacle housing which is intermediate section 32 and inner section 30. When the plug is inserted in the receptacle, packing 54 is squeezed between ring member 58 and member 57. This makes a very good seal. They hydrostatic head acting on area 57A of shoulder 57 maintains the packing 54 in compression once the seal is made.

Shoulder 60 is also for guiding the sloping surface of cap 50 of the pipeline lead plug into inner section 30. When the plug is inserted as shown in FIG. 4, there is an annular space 62 between plug section 48 and the wall of intermediate section 32 of the receptacle. Conduit 64 having a valve 66 is connected from this annular portion 62 to a pressure gage 68. The purpose of this will be seen as means for determining whether or not the plug has made a good seal with the receptacle. Base section 52 of the pipeline lead plug is connected to a pipeline 70 which is desired to be pulled through the wall 20A of igloo 20. Also, only one pipeline 70 is shown. It is to be understood that this could be a bundle of lines instead of a single line.

Attention will now be directed towards FIGS. 7 through 10, showing advantages of the support ring 22. FIG. 7 shows pipeline 70 lying on the ocean floor 12. It is connected by a cable 42 to winch means 44 inside the igloo. The receptacle housing 26 is mounted in the wall and the cable passes therethrough. In FIG. 7 the pipe has been drawn up to where it is on the ocean floor just below the support ring 22. Pipe 70 is connected to pipeline lead plug which is provided with a lead cap 50 which is connected to cable 42. In FIG. 8, cable 42 has been taken up where pipe lead plug 46 approaches ring 22. In FIG. 9, pipe 70 is pulled over the support ring 22. In FIG. 10, the plug 46 is fully inserted into receptacle 26.

Attention is now directed back to FIG. 3. The receptacle housing 26 of this embodiment is made of three sections having three diameters and three tapered shoulders, whereas the plug 46 has only two sections of two diameters and having two tapered shoulders. As can be seen, section 48 of the plug is of smaller diameter than the intermediate section 32 of the receptacle. This arrangement allows considerable misalignment as shown in FIG. 3, yet prevents strong stresses from being built up between the two as the plug is pulled into the receptacle. The lateral displacement of the tapered surfaces allows the turning moment indicated by the arrows to be induced by the tension in cable 42 and pulls the plug into place. This is without high contact pressure. The length of plug portion 48 should be preferably about three times its diameter so that high contact pressure will not be allowed to develop. A receptacle of the embodiment of FIG. 5 and a plug have been fabricated and have been tested. The dimensions of that receptacle are 12.94 inches and 10.12 inches diameter for sections 80 and 82, respectively. Plug 48 has an outside diameter of 10 inches and is 17.3 inches long, and the base member 52 has a diameter of 12.96 inches. The taper on the various shoulders of that receptacle is about 30° with the centerline of the receptacle.

An experiment was conducted to simulate the operations described above in regard to FIG. 7 through 10. The pipeline receptacle was mounted on a platform, which in this case was a truck bed, about 5 feet above the ground. A support ring about 4 inches in diameter was placed about 10 feet from the receptacle and about 4 feet off the ground. The pipeline lead plug was connected to four strings of 2⅜" strings of pipe laid out on the ground. The cable extended from the cap over the support line into the receptacle, through the packing gland and on to a winch. As the line was pulled in, the pipe and plug performed very closely to that depicted in FIGS. 7—10 in the present drawings and alignment was easily made.

In a similar experiment the pipe support ring was removed and the cable was wound upon the same winch to pull the same plug and pipe into the receptacle which was mounted on the same platform. It was possible to pull the plug into the receptacle without the support ring 22; however, it had to be pulled in by "jerks" as the alignment was not nearly so good as when the support ring 22 was used. The value of the support ring in improving alignment was amply demonstrated.

After the tapered pipe lead plug leads other pipe into the receptacle as indicated in FIG. 4, one determines the effectiveness of the seals of packing 54 and 36. This is done before cap 34 is removed. This is done by opening valve 66 in conduit 64 and observing the pressure of annular space 62 on meter 68. The pressure on the fluid can be bled off through valve 67 into the interior of the igloo, then valve 67 closed. If the pressure of gage 68 does not build up, or fluid does not continue to flow in, then one knows that a good seal has been obtained. Then cap 34 of the receptacle is removed and cap 50 of the lead plug 48 is removed and connections made to pipe 70 by connecting into the end of plug 48 where cap 50 was. It is to be noted that plug 48 is hollow and is in fluid communication with pipe 70. This, by connecting into the same connecting means as cap 50 was connected to, one effectively connects into pipe 70.

Figure 5:
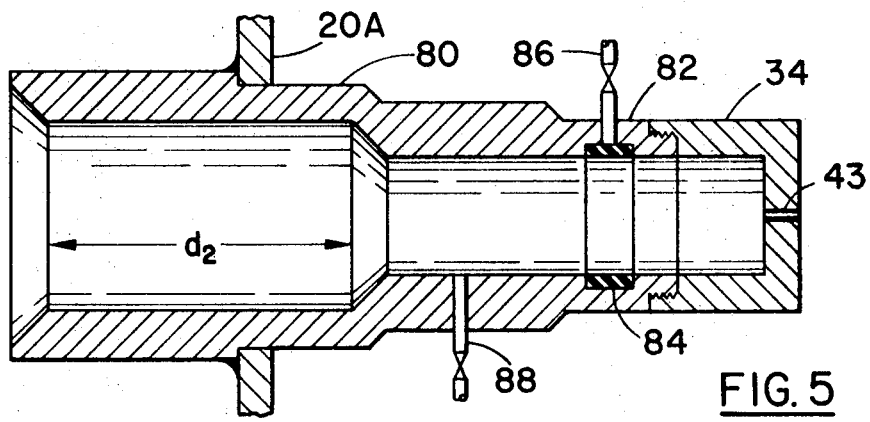
FIG. 5 illustrates a stepped receptacle having two sections of different diameters.

FIG. 5 illustrates a modified receptacle for use in the wall of igloo 20. Shown thereon is a receptacle having an outer portion 80 and an inner portion 82. It has a cap 34 similarly as the receptacle of FIG. 3. The receptacle of FIG. 5 differs from that of FIG. 3 in that it has only two sections of different diameter instead of three. However, section 80 which has the same diameter as plug 52 of FIG. 3 has a length approximately equal to the length of plug 48. That is, distance $d_1$ of the plug in FIG. 2 is approximately equal to the distance $d_2$ in FIG. 5. Thus, before the large portion of section 52 of the pipe lead plug 46 enters section 80, the nose portion 50 has entered the smaller diameter section 82. Section 82 has a seal 84 which can be actuated by a fluid being added thereto through conduit 86. Section 82 also has an outlet conduit 88 similar to the outlet conduit 64 of FIG. 3.

Figure 6:
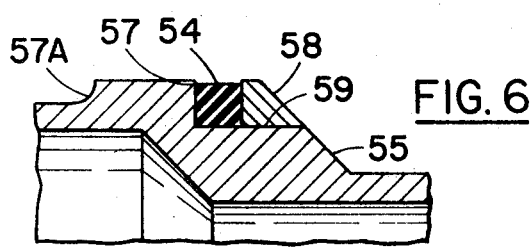
FIG. 6 is a fragmentary view illustrating the packing seal of the pipe lead plug of FIGS. 1 and 2.
Figure 11:
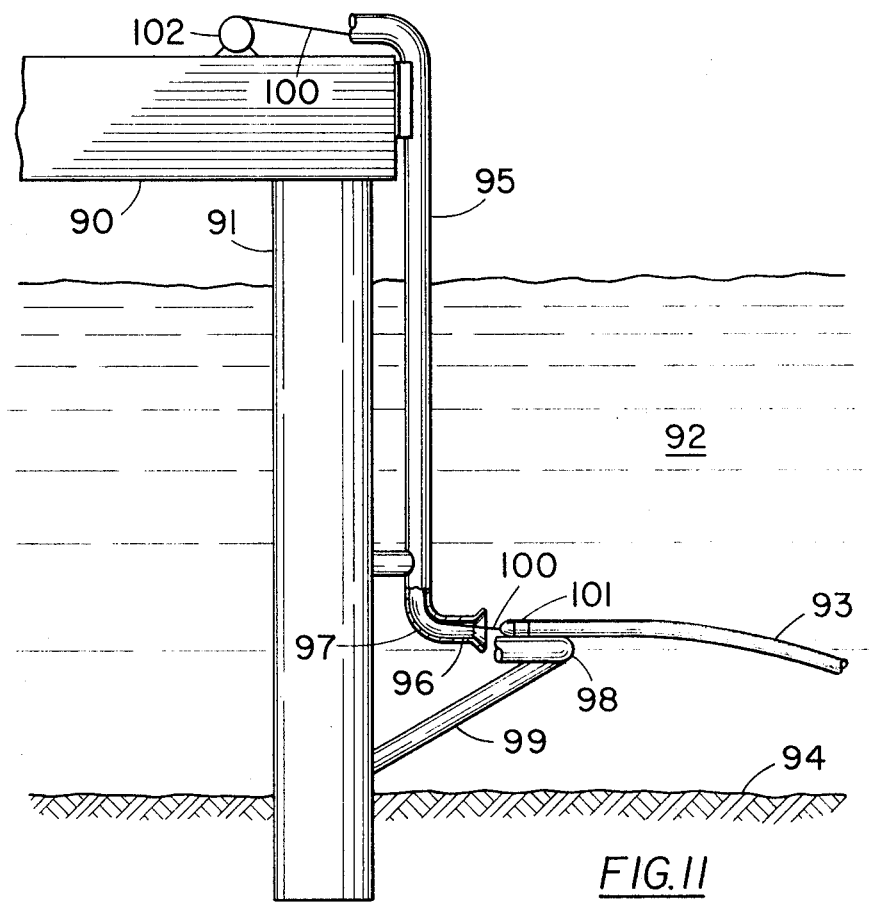
FIG. 11 illustrates an embodiment utilizing the pipe lead plug and receptacle for connecting an underwater pipeline to a vertical pipe supported by a platform.

The pipe connector housing and assembly of this invention can be used for other purposes than that described in connection with FIG. 1. For example, it can be used to connect a pipeline laid on the ocean floor to a vertical pipe extending to the top of a production platform. Such a modification is shown in FIG. 6. Shown in FIG. 6 is a platform 90 which is supported by legs 91 above a body of water 92. In this embodiment, it is desired to connect a pipeline 93 which extends along the bottom 94 of the body of water from a subsea well which is not shown, for example. It is desired to connect this pipeline 93 to a vertical pipe 95 which extends to the producing facilities on platform 90. A housing receptacle 96 similar to that shown in FIG. 5 is attached to the lower end of vertical pipe 95 and is placed in a more or less horizontal position. Pipe 95 at the bottom has a relatively smooth bend 97 which connects into the housing 96 as by welding or the like.

A laterally spaced support member 98 is supported from the platform 91 by support means 99. A function of support member 98 is the same as support ring 22 of FIG. 1. A cable 100 is connected to lead plug 101 which is connected on to pipe 93. The cable 100 extends upwardly through pipe 95 to a winch means 102 on platform 90.

Figure 12:
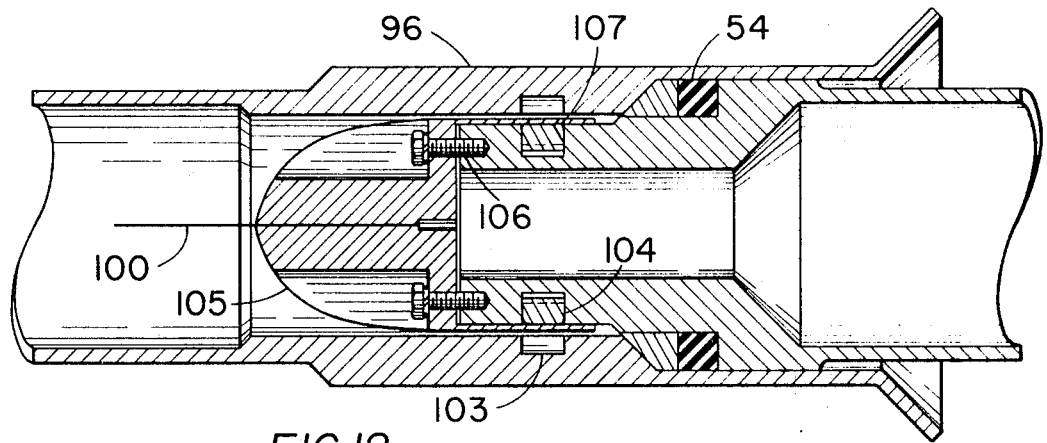
FIG. 12 is an enlarged view of the plug and receptacle shown in FIG. 11.

Attention is directed to FIG. 12 for an enlarged view of the plug and receptacle. Receptacle 96 is provided with an internal groove 103 which is adapted to receive outwardly biased latching means 104 which is a part of lead plug 101. Cable 100 is connected to lead plug 101 through a cap 105 which is connected to the main portion of the plug 101 by an explosive bolt 106. In operation pipe 93 is pulled by cable 100 until lead plug 101 is firmly fitted into housing 96, latching means 104 is in position to engage mating latching grooves 103, packing 54 forms a seal between plug 101 and housing 96. After this has occurred, explosive bolts 106 are actuated by any well-known means, such as by sonar. This releases cap 105 and it is pulled upwardly through pipe 95 by cable 100. This leaves the end of pipe 93 open to vertical pipe 95. Skirt members 107 are pulled out with cap 105. This permits outwardly biased locking means 104 to extend out into groove 103 of housing 96. Thus an effective seal connection has been made between horizontal pipe 93 and vertical pipe 95.

While the above detailed description relates to only a limited number of embodiments, various modifications can be made therefrom without departing from the spirit of the invention.

I claim:

1. A pipe connector which comprises:
a watertight underwater cellar;
a hollow pipe connector housing for mounting in the wall of said cellar and extending therethrough;
said connector housing being stepped and having an outer cylindrical section of a large diameter opening exteriorly of said cellar, an intermediate cylindrical section having a diameter smaller than the diameter of said outer section and an inner cylindrical section having a diameter smaller than said intermediate cylindrical section, the shoulders between said sections sloping outwardly;
a cap secured to the said inner cylindrical section, and
a cable extending through said cap in fluidtight, sliding and sealing relationship therewith.

2. A pipe connector as defined in claim 1 in which at least a part of said intermediate section and all of said inner section are interior of said cellar;
a pressure conduit extending into said cellar from the hollow portion interior said intermediate section to the interior of said cellar, and
a pressure gage on said conduit.

3. A pipe connector as defined in claim 2 including a ring-shaped packing means on the interior of said inner section, and means to force said packing means inwardly.

4. A pipe connector as defined in claim 1 including:
a support ring positioned around and at a lateral distance from said cellar and spaced vertically just below said pipe connector housing.

5. A pipe connector as defined in claim 3 including a pipe lead plug means for insertion into said connector housing, said plug means having a first section having a diameter approximately the same as the inner diameter of said inner section of said housing, said first section being longer than said intermediate section of said housing;
a second section having a diameter approximately the same as the inside diameter of said outer section of said housing;
said first section and said second section having a shoulder member therebetween for mating with the shoulder member between said intermediate section and said outer section of said connector housing;
means connecting said cable to the end of said plug means.

6. A pipe connector assembly which comprises:
a watertight underwater cellar;
a hollow pipe connector housing in the wall of said cellar, said housing being stepped and having an outer cylindrical section of a large diameter and an inner cylindrical section having a diameter smaller than the diameter of said outer section;
sloping shoulders between said outer section and said inner section;
a cap on the end of said inner section, and
packing means extending through said cap so that a line can be passed therethrough in a fluidtight, sliding sealing relationship therewith.

7. A pipe connector as defined in claim 6 including:
a support member spaced laterally from said cellar and spaced vertically below said pipe connector housing.

8. A pipe connector assembly as defined in claim 6 including a pipe lead plug means for insertion into said connector housing, said plug means having a first section having a diameter approximately the same as the inner diameter of said inner section of said housing, said first section being about the same longitudinal length as the said outer section of said housing;
a second section having a diameter approximately the same as the inside diameter of said outer section of said housing;
said first section and said second section having a shoulder member therebetween for mating with the shoulder member between the outer section and inner section of said connector housing;
means connecting said cable to the end of said plug means.

9. A pipe connector assembly for use with a platform supported above a body of water, which comprises:
a vertical pipe extending from the platform to close to the floor of said body of water, the lower end of said pipe being bent to have a substantially horizontal portion;
a hollow pipe connector housing connected to said horizontal portion, said connector housing having an outer section of large diameter and an inner section having a diameter smaller than the diameter of said outer section, and sloping shoulder between said outer section and said inner section;
a pipe lead plug means for insertion into said housing, said plug means having a first section having a diameter approximately the same as the inner diameter of said inner section of said housing, said first section being about the same longitudinal length as the length of said outer section of said housing;
said plug means having a second section having a diameter approximately the same as the inside diameter of said outer section of said housing;
said first section and said second section having a shoulder member therebetween for mating with the shoulder member between the outer section and the inner section of said connector housing in a sealing relationship;
a flexible line connected to the end of said plug means and extending upwardly through said vertical pipe;
means for releasing said line from said plug means, and
latching means for latching said plug means to the interior of said housing.

10. An assembly as defined in claim 9 including a support member spaced laterally from the base of said platform and spaced vertically below said pipe connector housing.

11. A pipe connector assembly which comprises:
a hollow pipe connector housing being stepped and having an outer cylindrical section of a large diameter and an inner cylindrical section having a diameter smaller than the diameter of said outer section;
sloping shoulders between said outer section and said inner section;
a cap on the end of said inner section;
packing means extending through said cap so that a line can be passed therethrough in a fluid-type sliding, sealing relationship;
a pipe lead plug means for insertion into said connector housing, said plug means having a first section having a diameter approximately the same as the inner diameter of said inner section of said housing, the longitudinal length at said first section being about at least the longitudinal length of the outer section of said housing;
a second section having a diameter approximately the same as the inside diameter of said outer section of said housing;
said first section and said second section having a shoulder member therebetween for mating with the shoulder member between the outer section and inner section of said connector housing;
means connecting said cable to the end of said plug means.